US008161044B2

(12) United States Patent
Blackwell et al.

(10) Patent No.: US 8,161,044 B2
(45) Date of Patent: Apr. 17, 2012

(54) FACETED WEB SEARCHES OF USER PREFERRED CATEGORIES THROUGHOUT ONE OR MORE TAXONOMIES

(75) Inventors: Jason M. Blackwell, Vestal, NY (US); Claude J. Elie, Vestal, NY (US); Danny R. Hager, Binghamton, NY (US); Clare T. Kibler, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 11/258,130

(22) Filed: Oct. 26, 2005

(65) Prior Publication Data

US 2007/0094241 A1    Apr. 26, 2007

(51) Int. Cl.
*G06F 7/00* (2006.01)
*G06F 17/30* (2006.01)
(52) U.S. Cl. .......................... 707/731; 707/765; 715/745
(58) Field of Classification Search .............. 707/3, 731, 707/765; 715/745
See application file for complete search history.

(56) References Cited

U.S. PATENT DOCUMENTS

| | | | |
|---|---|---|---|
| 5,768,581 A * | 6/1998 | Cochran ........................ 707/741 |
| 5,907,838 A | 5/1999 | Miyasaka et al. |
| 6,121,968 A | 9/2000 | Arcuri et al. |
| 6,185,550 B1 * | 2/2001 | Snow et al. ...................... 707/1 |
| 6,434,556 B1 | 8/2002 | Levin et al. |
| 6,483,523 B1 | 11/2002 | Feng |
| 6,925,458 B2 * | 8/2005 | Scaturro et al. ...................... 1/1 |
| 7,080,070 B1 * | 7/2006 | Gavarini ........................... 707/5 |
| 7,107,261 B2 | 9/2006 | Farrett |
| 7,502,783 B2 * | 3/2009 | Palmon et al. ........................ 1/1 |
| 2001/0049677 A1 * | 12/2001 | Talib et al. ........................ 707/3 |
| 2002/0016786 A1 | 2/2002 | Pitkow et al. |
| 2002/0135614 A1 | 9/2002 | Bennett |
| 2002/0167548 A1 | 11/2002 | Murray |
| 2003/0220912 A1 | 11/2003 | Fain et al. |
| 2003/0220913 A1 * | 11/2003 | Doganata et al. ................. 707/3 |
| 2004/0019610 A1 | 1/2004 | Burns |
| 2004/0040039 A1 * | 2/2004 | Bernier ........................... 725/46 |
| 2004/0078225 A1 * | 4/2004 | Schramm-Apple et al. ....... 705/2 |
| 2004/0128282 A1 | 7/2004 | Kleinberger et al. |
| 2004/0133413 A1 * | 7/2004 | Beringer et al. ................ 703/22 |
| 2004/0230572 A1 * | 11/2004 | Omoigui ........................... 707/3 |
| 2006/0069674 A1 * | 3/2006 | Palmon et al. .................... 707/3 |
| 2007/0011146 A1 * | 1/2007 | Holbrook ........................... 707/3 |

OTHER PUBLICATIONS

Tom Negrino and Dori Smith, "JavaScript for the World Wide Web: Visual Quickstart Guide, Fifth Edition", Peachpit Press, Pub Date: Jul. 14, 2003, p. 20.*
Merriam-Webster® Online Dictionary, "Scheme", "www.m-w.com".*
Siderean Software, From Site Search to the Semantic Web "A White Paper" Jan. 2003.
Examining the Usability of Web Site Search by Jennifer English et al.
Flexible Search and Navigation using Faceted Metadata by Jennifer English et al.

* cited by examiner

*Primary Examiner* — Cam Truong
(74) *Attorney, Agent, or Firm* — William Schiesser; Roberts Mlotkowski Safran & Cole, P.C.

(57) ABSTRACT

A system and method of web searching is provided. The method comprises defining one or more user preferred categories and conducting a search within the one or more user preferred categories based upon search criteria by comparing the search criteria to content information within each of the one or more user preferred categories. The method further includes displaying search results associated with each of the preferred categories which have matching criteria based on the conducted search.

40 Claims, 8 Drawing Sheets

Choose geography category to add to my categories

| Geography | Europe/Middle East/Africa | 705 |
|---|---|---|
| Region | EMEA Nordic | 710 |
| Country | Norway | 715 |

Submit   Cancel

Search for: PACTS  GO  My Search
☐ Search within results  ☑ Search within my categories 200  200A  205  210

*FIG. 7a*

Search for: [       ] [GO]  My Search Profile Help
☐ Search within results   ☐ Search within my categories 205  200A  210

Results for: My categories* : Geo > EMEA* > EMEA Nordic* > Norway* | Industry > Automotive* OR Banking*
OR CPG* | Offerings > Hardware*
AND: Text "PACTS"*

62 results found          Hide Details          Sort results by [Recency] [GO]
Top 62 shown

XYZ Co. Tech Support Moves Back From India (Newsbrief, December 12, 2003)
XYZ Co.'s customer satisfaction with technical support has eroded so badly that they have pulled their

*FIG. 7b*

FACETED WEB SEARCHES OF USER PREFERRED CATEGORIES THROUGHOUT ONE OR MORE TAXONOMIES

FIELD OF THE INVENTION

The invention generally relates to providing a customized web searching tool and method of use and, more particularly, to providing user preferred categories in faceted web searches and a method of searching.

BACKGROUND OF INVENTION

Faceted searches are powerful tools that allow the results to be categorized so that the user can further narrow the search quickly and easily. Thus, in this manner, the faceted search provides a simple means for users to add criteria to a search to help narrow the results.

By way of example, during a faceted search, the user is capable of browsing through the search results, while still permitting further narrowing of the search by adding additional criteria to the search. In addition to providing lists of pages that match a keyword search, faceted search shows lists of categories that contain matching pages. With the lists of categories, the user can then select one or more categories to narrow their search.

As thus, it has been found by many Internet retailers that the use of faceted searches is a very powerful tool. In such applications, the faceted search can provide, for example, Displaying aspects of the current results set in multiple categorization schemes;

The ability for the user to use a point-and-click approach for narrowing the search based on the characteristics being sought (e.g., type of item, color, features, cost);

Showing only populated categories; and/or

Displaying a count of the contents of each category.

For these and other reasons, the faceted search is growing quickly on the World Wide Web, and a number of the better-known retail sites have already adopted such searching tools, such as, for example, amazon.com, Sears, Wal-Mart and other large retailers.

Faceted searches, though, have potential shortcoming that must still be addressed. For example, the number of possible matching categories can be very large, which complicates the search. Another shortcoming is that, in many cases, the categories have sub-categories so that focusing in on the desired category may take the user through multiple levels, e.g., many hyperlinks or mouse "clicks". For example, to see the category "Chairs and Recliners", the user may first have to click "Furniture and Decor", then "Sofas, Love Seats, & Chairs", and finally "Chairs and Recliners". Finally, users with known interests across multiple taxonomies (e.g., music interests which are "blues" and "CDs" and "$15-$20") must take multiple steps to narrow their search across multiple taxonomies.

Thus, although faceted searches make it much easier for users to search through a specific database, producing effective search queries still remains difficult and elusive to many users. Simply, the efficacy of a faceted search depends on the speed with which a user can find the categories of interest. But, there are many issues that may impact the speed of the search: "breadth of categories", "depth of categories", and "cross-taxonomy interaction."

Breadth of Categories

By way of illustration, there may be countless categories (e.g., 50 or more categories) for a user to choose during the search. In these cases, one of the categories of interest may be, literally, one of the last categories, which requires the user to scroll through the majority of categories prior to obtaining the desired category of interest. Thus, in order to narrow the search, the user would need to scroll through almost each and every category.

Depth of Categories

When categories are hierarchically organized, users may have to "drill down" into categories to find the sub-category of interest. This is the case even though the user already knows and has regularly visited the desired category. For example, suppose a Political Science student wants to find a Political Science book on a certain retailer's website. Although the student cannot recall the specific title, she does remember that the title has the word "file". To begin, the student:

(i) starts a search with the word "file";

(ii) scrolls down to "Books" (e.g., category #11), and clicks the link, limiting the results to books with "file" in the description; and (iii) scrolls down to Political Science (e.g., category #10) and clicks the link, limiting the results to Political Science books with "file" in the description.

Thus, even though the user had a well-known interest when coming to the site, the user still had to click multiple times to access the desired category. Of course, although two clicks does not seem extreme, this can quickly become frustrating if the user regularly uses the site and is frequently interested in that category.

These issues are likely to become more pronounced as faceted searches become ubiquitous; including moving into business and especially large databases (e.g., breadth/depth of categories of the Library of Congress). In fact, the examples above are in many ways the simplest case, and do not illustrate the final issue of "cross-taxonomy interaction".

Cross-Taxonomy Interaction

In some cases, users may want to refine a search by selecting subcategories from different taxonomies. The issue here is much like depth of categories, except that with each successive category selection, the remaining category changes to reflect the new result set.

By way of illustration, suppose a music-lover is interested in Blues music, and only buys CDs. In this example, the user hears a song on the radio, but only hears the artist's last name, Davis, for example. Now, at a large retail website, the user performs a search on "Davis", and obtains a large number of songs. One at a time, the user must make a selection from the "Genre" category (Blues), and from the "Format" category (CD) to narrow the search. This can be frustrating to the user.

Accordingly, there exists a need in the art to overcome the deficiencies and limitations described hereinabove.

SUMMARY OF THE INVENTION

In a first aspect of the invention, a method comprises defining one or more user preferred categories and conducting a search within the one or more user preferred categories based upon search criteria by comparing the search criteria to content information within each of the one or more user preferred categories. The method further includes displaying search results associated with each of the preferred categories which have matching criteria based on the conducted search. In one embodiment, the method may be a method for deploying an application for web searching, comprising providing a computer infrastructure being operable to perform the steps noted above.

In another aspect of the invention, the method comprises defining favorite categories and comparing user defined search criteria with information associated with the favorite categories. The method additionally comprises retrieving and displaying content information associated with the favorite categories and allowing a user to search the favorite categories in a single step for the content information obtained by the comparing step, even when the categories are from different taxonomies.

In another aspect of the invention, a system comprises a server having a database containing data associated with one or more user predefined categories. A hardware and/or software component searches the database for content information associated with the one or more user predefined categories based upon search criteria. The system compares the search criteria to the content information within each of the one or more user predefined categories and provides the search results to the user by presenting a list of the one or more user predefined categories which have matching categories with the search result, while providing the one or more user predefined categories in a list of taxonomies.

In another aspect of the invention, a computer program product comprising a computer usable medium having readable program code embodied in the medium is provided. The computer program product includes at least one component to:

define one or more user preferred categories;

conduct a search within the one or more user preferred categories based upon search criteria by comparing the search criteria to content information within each of the one or more user preferred categories; and display search results associated with each of the preferred categories which have matching criteria based on the conducted search.

BRIEF DESCRIPTION OF THE DRAWINGS

FIGS. 6a and 6b are representations of a GUI of a manual designation implemented in accordance with an embodiment of the invention;

FIGS. 7a and 7b are representations of a GUI of a faceted search using the "fast path" of FIG. 2 implemented in accordance with an embodiment of the invention.

BEST MODE FOR CARRYING OUT THE INVENTION

The invention is directed to a method and system for searching data over the Internet and more specifically on the World Wide Web. The invention can also be implemented for searching within any database, over any distributed network or stand-alone server, for example. The system and method of the invention, in one embodiment, accelerates a user's search by providing "favorite" or "preferred" categories associated with database taxonomies. The "favorite" categories may be based on, for example, past user history, user profiles and/or survey data, or overt selection by the user, to name but a few. Once "favorite" categories are designated, these categories can then be used to provide accelerated ways for users to narrow searches to their usual areas of interest.

By using the invention, it is now possible to accelerate access to frequently used categories, particularly in faceted searches in World Wide Web applications, which greatly improves user satisfaction. The invention additionally results in providing potentially more "hits" on a particular site, greater ease in finding items that matched user interests, and increased visibility and user friendliness.

Figure 1:
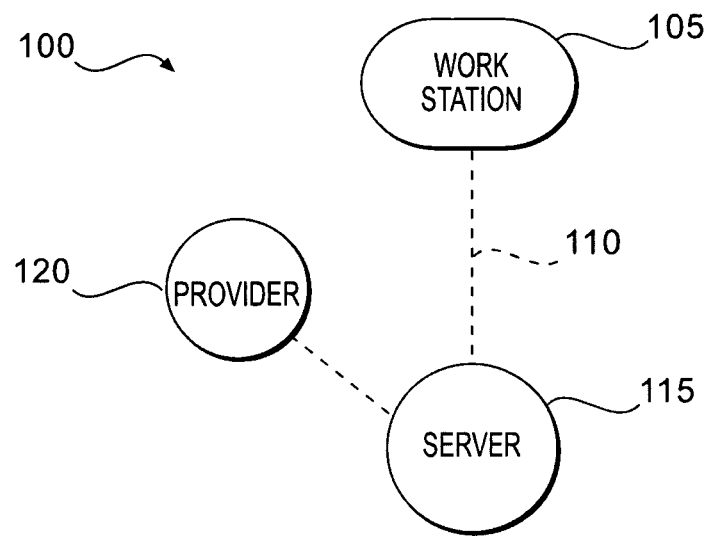
FIG. 1 is a block diagram of an embodiment of the invention.

FIG. 1 is a block diagram of an embodiment of the invention, generally denoted by reference numeral 100. The components of FIG. 1 may be used to implement the processing of the invention, as discussed more fully below. The invention includes at least one user workstation 105 (i.e., a computer for a user, a workstation, or client workstation) which typically has a memory device (for example, a hard drive, DVD drive, or the like), processor and accompanying components, all well known to those of skill in the art. The user workstation 105 may be connected via a network 110 (e.g., a local area network (LAN), a wide area network (WAN), wireless network, or the Internet) to one or more server 115.

FIG. 1 further shows at least one content provider 120, which provides content on the server 115. For illustrative purposes, the server 115 may be representative of content sources which one of ordinary skill in the art would recognize may be any number of servers and may be different content sources such as, for example, WebSphere, DB2 databases, Web sites, or the like.

Still referring to FIG. 1, in embodiments of the invention, the content can be categorized according to user preferences, as discussed below. Once the content is categorized, the system and method provides a control to search the favorite or preferred categories, amongst taxonomies. It is contemplated by the invention that the preferred categories can be designated by many different mechanisms. For example, the service provider 120 may:

Remember a last search conducted by the user;

Remember search behavior of the user, i.e., remembering multiple searches conducted by the user and prompting the user, after a number of categories have been found to be common, whether the user wishes to save the categories as preferred categories;

Have users make the favorite or preferred categories explicitly; and/or

Use user profiles, e.g., use surveys to determine fundamental user groups and their preferences and have the preferences recorded by an administrator and/or Record these preferences with a number of techniques, such as the implementation of cookies.

Thus, by way of one illustrative example, the user can explicitly designate categories for a favorite category list, amongst taxonomies, by navigating to a particular category or combination of categories and activating a control to save the category set as a preferred or favorite category. The system, e.g., service provider, then records the categories, and automatically adds them to the list of preferred categories.

In another example, a user profile may be created whenever the user re-characterizes the user's interests, e.g., categories. Thus, according to the invention, a user profile may be created that profiles a user's interests (for example, a user may be a financial trader responsible for aspects of the automotive industry in Europe and the United States, or the like). In this way, the profile succinctly provides a basis that defines the areas of content interest or categories (in this example, finance, automotive, Europe and United States) which may be provided to the server and used for subsequent searching.

Figure 2:
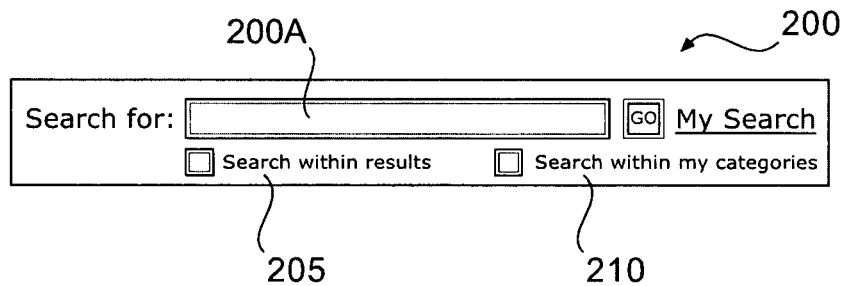
FIG. 2 is a representation of a graphical user interface (GUI) implementing an embodiment of the invention.

FIG. 2 is an embodiment of a graphical user interface (GUI) for searching categories, generally denoted by reference numeral 200. In FIG. 2, the GUI includes a "fast path" mechanism for obtaining search results associated with, for example, the user preferred or favorite categories. Thus, in implementation, the fast path mechanism provides an option for the user to search only the user preferred categories, when executing a text search.

In the example of FIG. 2, prior to the search, the user will select certain preferred categories within the taxonomies; that is, the user already adds the preferred categories, for example, prior to the user interfacing with the server. In the embodiment of FIG. 2, a search field 200A is provided with two options: a search within the results category 205 and a "search within my categories" 210. The results category 205 allows a user to refine the search within the found categories; whereas, the "search within my categories" 210 allows a search to be conducted only within the user's preferred or favorite categories.

In one example of use, after an initial search has been conducted, a user may highlight the results category 205 and conduct an additional search using the selected categories. This will allow a search to be narrowed to within only those previously searched categories thus speeding the search process. On the other hand, by selecting the "search within my categories" 210, it is now possible to conduct a search only within the user's favorite categories.

As discussed in greater detail below, after the initial search term is entered and a search term is found within the searched taxonomies, the user can then immediately access the favorite categories without having to scroll down/search through categories which are not of interest to the user. Thus, by using the invention, it is now possible to allow the user to search his/her favorite categories in a single step, even if the categories are from different taxonomies. This speeds the process of users finding what they need, gives them the sense that the site is personalized for them, and generally provides a more user-friendly experience.

Figure 3:
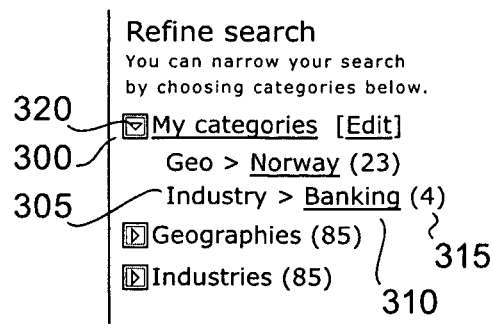
FIG. 3 is a representation of a GUI implementing an embodiment of the invention.

FIG. 3 shows a listing of preferred categories, listed after an initial search is conducted. The listed preferred categories 300 (termed "my categories") allow the user to search for a particular search term within the preferred categories. In implementation, the preferred categories 300 provide controls for the user to quickly search within the user favorite (or pre-selected) categories before or after a search has been executed. In this manner, the user does not need to browse through multiple levels to find the preferred results within a certain preferred category. The listed categories may be presented or defined in hierarchical manner as to provide specific search focus. The preferred categories may be represented in an HTML listing, provided to a client workstation so that navigation pages may be built at the workstation for access to content information, and, in embodiments, provided as a service of the server.

Still referring to FIG. 3, the preferred categories 300 may include categories, for example, "Geo">"Norway" 305 and "Industry">"Banking" 310, each having at least one "hit" associated with the search term, as shown by a number designation 315 indicating the number of "hits" within each category. The preferred categories 300 may additionally have an "expand" function 320, which can be used to expand the preferred categories 300 to include all of the pertinent categories associated with the preferred categories 300. These categories are illustrative examples and one of ordinary skill in the art would recognize that other similar categories are possible and contemplated by the invention. The listed categories may be presented or defined in hierarchical manner as to provide specific search focus.

Figure 4:
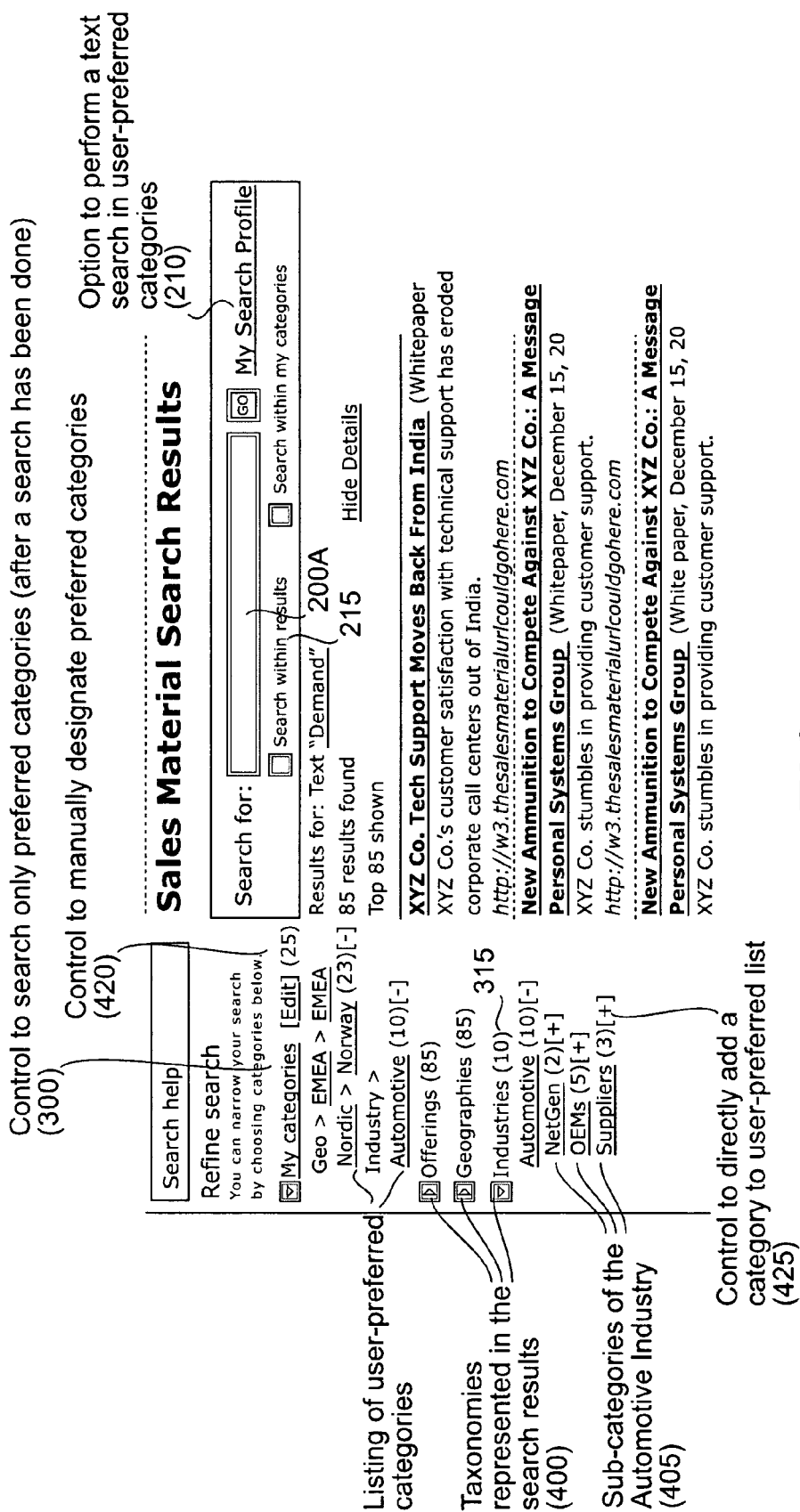
FIG. 4 is a representation of a GUI of a faceted search implemented in accordance with an embodiment of the invention.

FIG. 4 shows an advanced search screen implementing the invention. In FIG. 4, as an example, a search was conducted for "Demand". As a result of this search, several different taxonomies are shown including, for example, "My Categories" (e.g., preferred categories) 300, which include several categories, e.g., ---
Geo" > EMEA > EMEA
    Nordic > Norway (23)[1]
Industry >
    Automotive (10)[−]

---

In addition, other taxonomies 400 and sub-categories 405 may be presented. These taxonomies 400, in addition to the preferred categories 300, may include expand functions 320, as discussed above. In addition, each of the sub-categories 405 may include a number designation 315 which represents a number of results for each of the sub-categories 405. The number designation 315 may also be associated with the favorite categories.

Still referring to FIG. 4, a content submission tool is used to acquire, create, update or delete content information. In use, the content submission tool classifies and tags content and relates such content to certain, user favorite categories, or deletes content already associated with certain, user favorite categories. In one example, the tagging is maintained in a database, e.g., server, so that each content that is tagged may be located by matching known tags corresponding to tags in a user profile.

In one non-limiting illustrative example, the content submission tool may include an add function, denoted by [+] associated with sub-categories; whereas, the categories associated with the preferred categories 300 may include a subtract function, denoted by [−]. As discussed in more detail with reference to FIGS. 5a and 5b, the add function, [+], allows the user to easily add a new category to the preferred categories 300, by selecting the add function, [+]. On the other hand, a user may delete a category associated with the preferred categories 300 by selecting the subtract function, [−]. In addition, an "Edit" function 420 may be associated with the preferred categories 300. This "Edit" function allows the user a quick mechanism to edit the preferred categories 300, as discussed with reference to FIGS. 6a and 6b. In addition, the user may directly add a category to the user preferred list by use of link 425.

Figures 5A, 5B:
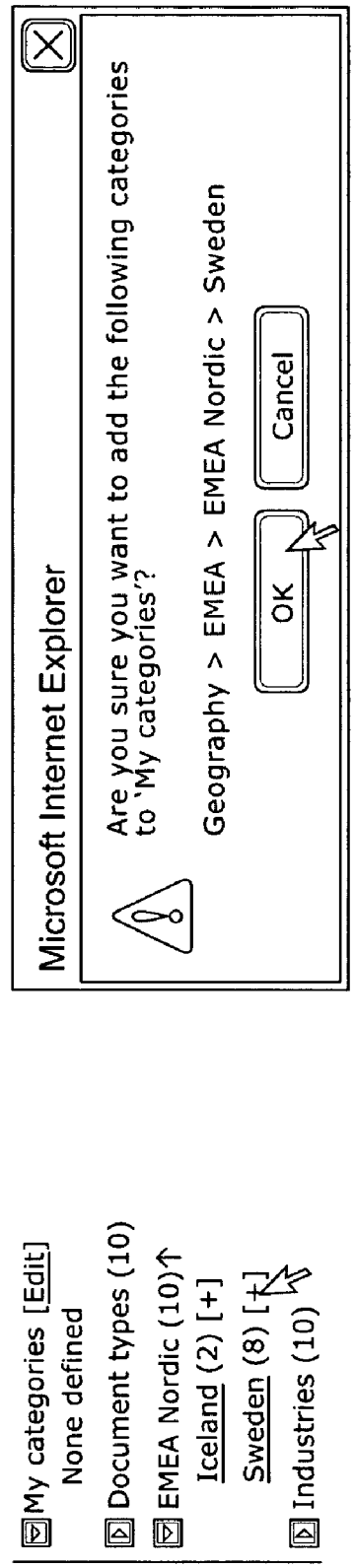
FIGS. 5a and 5b are representations of a GUI of a quick designation implemented in accordance with an embodiment of the invention.

As an example of an application of the add function, FIGS. 5a and 5b shows a GUI implementing the invention. In this illustrative example, a user may select the add function, [+], for "Sweden". A confirmation dialogue box will then appear requesting confirmation of "Sweden" to be added to the preferred categories 300. In this example, the sub-category of "Sweden" will then be placed within the hierarchy, as follows:

"Geography>EMEA>EMEA Nordic>Sweden"

In subsequent searches, the sub-category of "Sweden" will be searched and then displayed in the preferred category 300. In this manner, the user will no longer have to "drill" down a list to view search results associated with Sweden, thus expediting any search. This may be implemented, by way of example, by tagging the category "Sweden", and maintaining the tag in a searched database, e.g., server, so that each content that is tagged may be located by matching known tags corresponding to tags in the user profile.

Figure 6A:
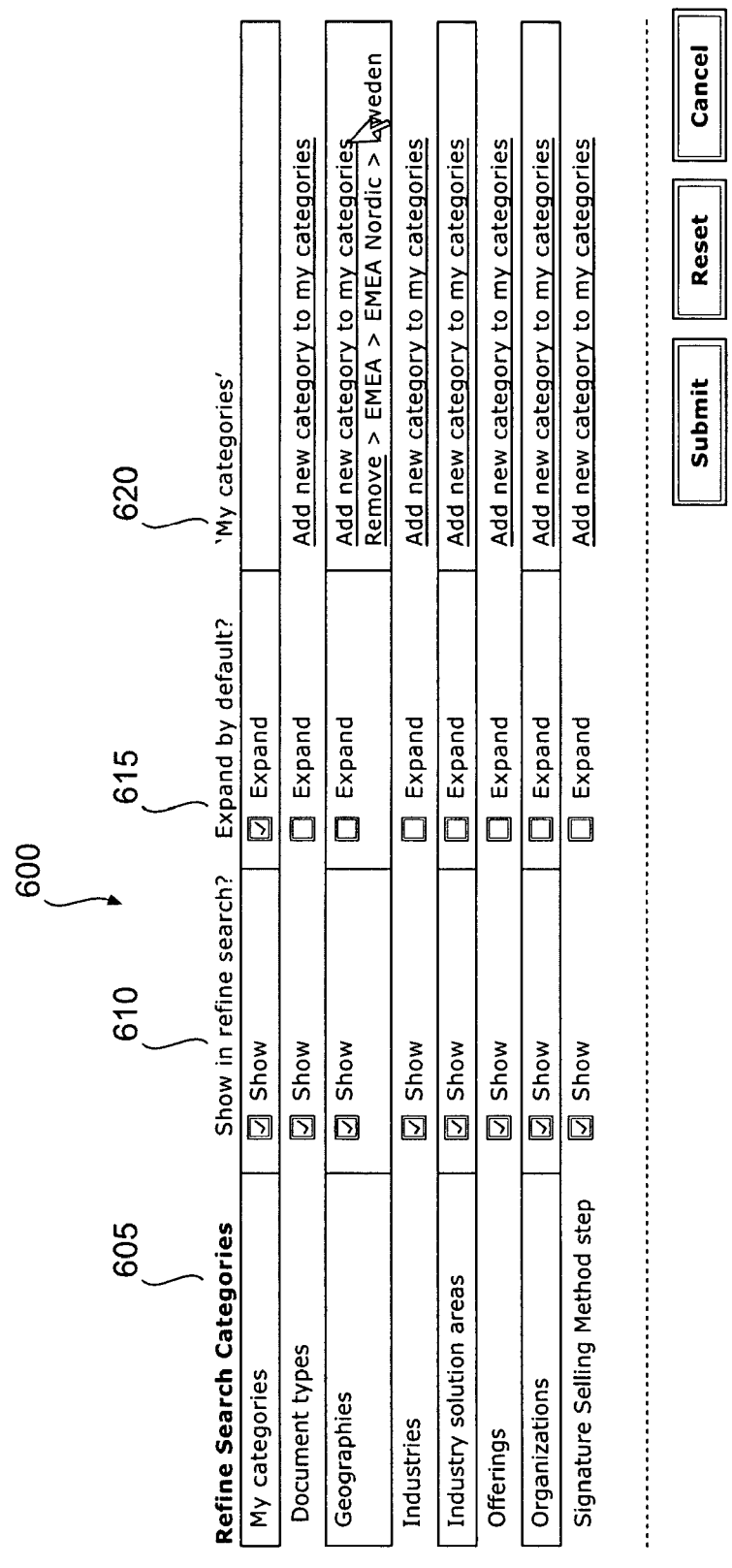

In another embodiment, as shown in FIGS. 6a and 6b, a user may edit the preferred categories 300 using the "Edit" function. In this illustrative example, the user may select the "Edit" function 420 of FIG. 4, for example, at which stage the dialog screen 600 will be viewable by the user. The dialogue screen 600 may include several illustrative headings such as, for example, "Refine Search Categories" 605, which may include "My Categories (preferred categories) 300, in addition to, for example, "Document types", "Geographies", "Industries", "Industry solution areas", "Offerings", "Organizations", "Signature selling method step", etc. It should be understood that the "Refine Search Categories" 605 may include many different categories depending on the database, none of which are limited to the categories shown herein.

The dialogue screen 600 may additionally include headings such as, for example, "Show in refine search" 610, "Expanded by default?" 615 and "My categories" 620. By way of illustration, the functionality associated with the "Show in refine search" 610 allows a user to choose which category will be shown in the refined search. The functionality associated with the "Expanded by default?" 615 allows the user to choose which categories will automatically be expanded without the need to manually expand the category on the search screen. The functionality associated with the "My categories" 620 allows a user to add a new category or delete a previously added category in the preferred categories list 300. This will affect the searched categories. As with the functionality associated with "Show in refine search" 605 and "Expanded by default?" 615, the "My categories" 620 will have the capability of being associated with any category in the "Refine Search Category" 605 list.

Referring to FIG. 6b, once a user selects a specific link associated with the "My categories" 620, e.g., geographies, a dialog box 700 will appear which is associated with the selected category, in this case geographies. It should be understood by those of ordinary skill in the art that the dialog box 700 may be associated with any of the refine search categories, and that the category of "geographies" is provided as an illustrative example only.

Using the dialog box 700 of FIG. 6b, the user may then populate the fields 705, 710 and 715 in order to add a category to the preferred categories list 300. In this example, the fields include, from most general to specific, Geography category 705, Region category 710 and Country category 715. By way of example, the region category 710 provides an indication of a subset of the geographic region. Similarly, the country category 715 provides a subset of particular countries, if applicable, associated with the region category 710. In other examples, the dialog box may include other categories such as, for example, a sector category indicative of an industry sector, e.g., communications, financial services, public, industrial, or other sectors.

As thus should be understood, the dialog box 700 reflects a hierarchical structure from greater to lesser breadth; geography is superior to region, which is in turn superior to country. All subordinate values may be proper subsets of superior values. For example, selection of a region implies a selection of geography as well as in conjunction with the region. Selection of a country implies selection of the region by itself as well as in conjunction with the country.

FIGS. 7a and 7b are an illustrative diagram showing an exemplary logical organization of content based on a user's categories. When content is supplied to a user (or workstation) based on the user's matching categories, the information may be organized into different presentations for a user's convenience and access. For example, referring to FIG. 7a, the user will select the "search within my category" 210, and enter a search, e.g., PACTS, in the "search for" dialog 200. Referring to FIG. 7b, the results for the search are shown under the dialog box, which may result in:

My categories*: Geo > EMEA*>EMEA Nordic*>Norway |
Industry > Automotive * OR Banking* or CPG*| Offerings >
Hardware*
   AND: Text "PACTS"*

The user can then select any of the categories in order to view the search result, associated with that category. In this manner, the system and method of the invention provides a listing of the user's preferred categories in the faceted search, so users do not need to look elsewhere to view the search results. Thus, the users can choose to narrow the search to any one of their preferred categories.

Still referring to FIG. 7b, as an additional functionality, the user may select any of the "*" to further refine the search. For example, by selecting the "*" after "Automotive", the search would be performed again, using a more general searching category, i.e., deleting the category "Automotive" and any lower level categories in the hierarchy. The search page may additionally show the results found. The preferred categories may also be displayed in its usual taxonomy.

In embodiments, the examples of FIGS. 2 through 7b may be implemented and executed from either a server, in a client server relationship, or they may run on a user workstation with operative information conveyed to the user workstation to create the navigation outlined above. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-RNV) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 8:
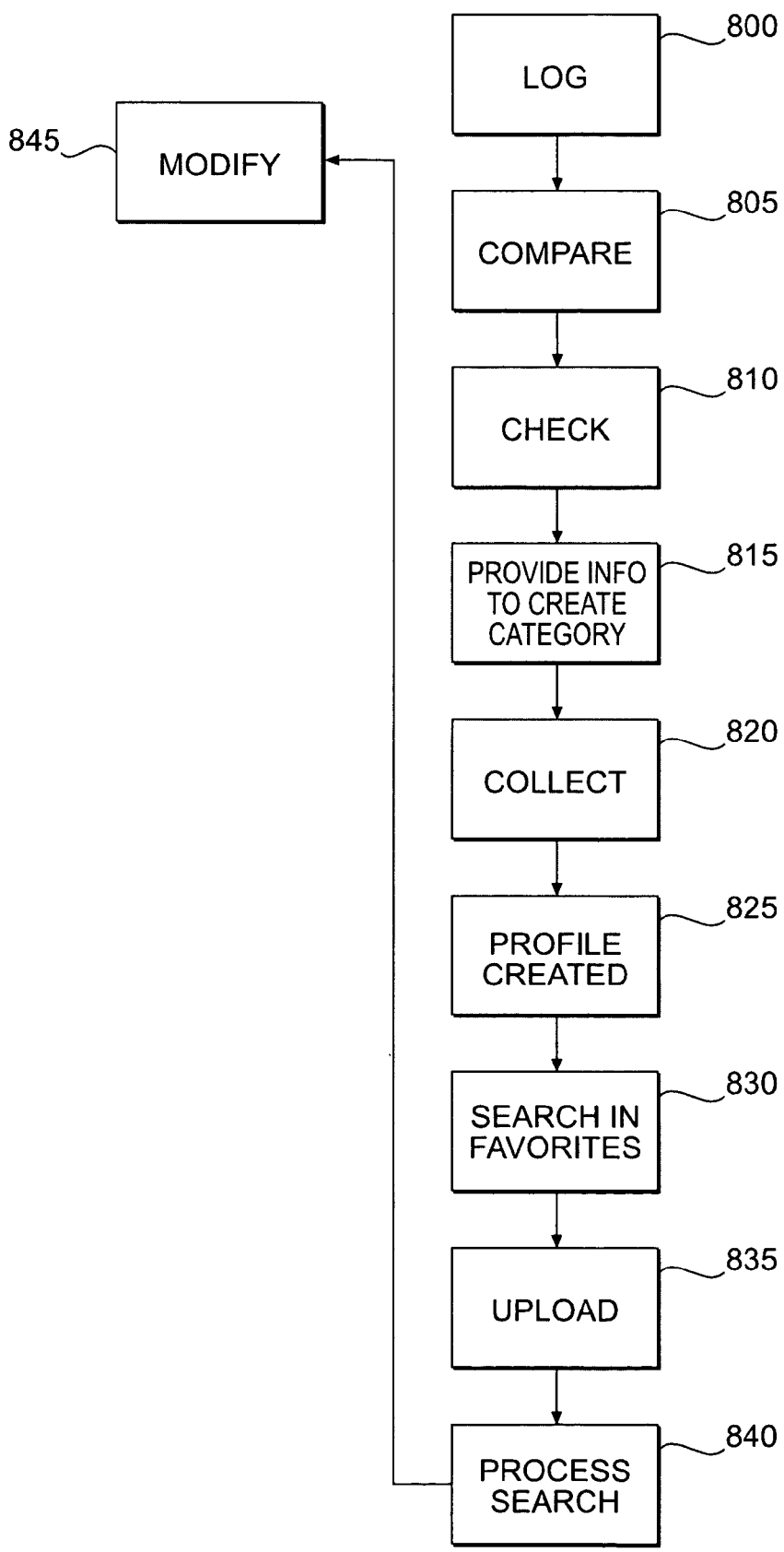
FIGS. 8-10 are representative flow charts of steps for implementing aspects of the invention.
Figure 9:
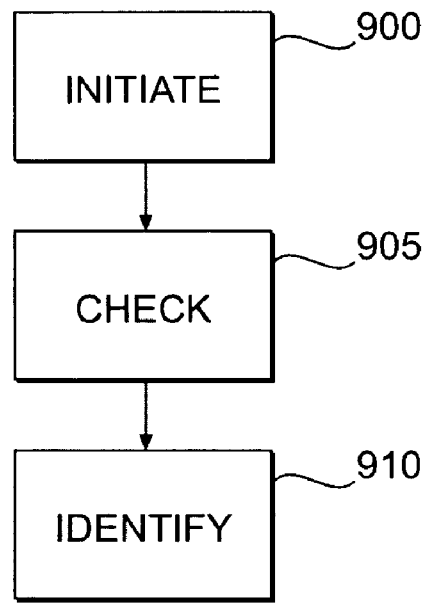
Figure 10:
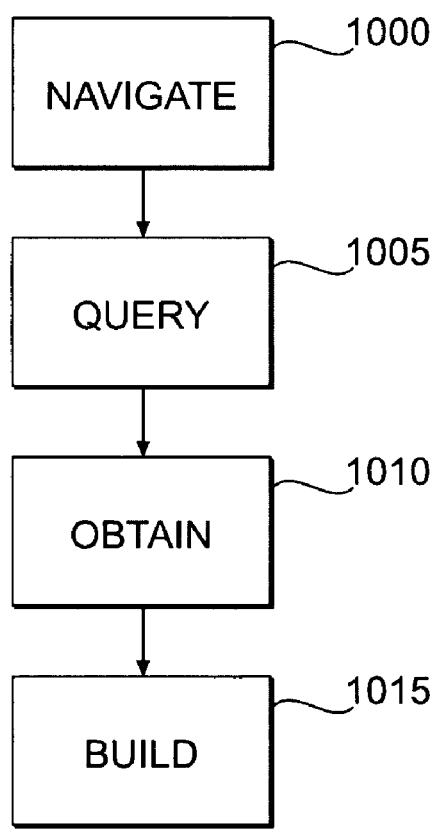

FIGS. 8-10 are flow diagrams of an embodiment of the invention. FIGS. 8-10 may also be representative of a high-level block diagram, implementing the steps of the invention. The steps of FIGS. 8-10 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM).

Referring to FIG. 8, at step 800, a user logs onto a website or server by providing a unique identifier. This unique identifier may be a user ID or account number, for example. At step 805, the user identifier is compared to a database table to determine if this is a known user. At step 810, a check is made if the user is a new user or a known user. If a new user, at step 815, user information may be provided to create favorite categories of the user, prior to a search being conducted. In one embodiment, at step 820, user information is collected, such as user interests, typically using a form or automatically, to update the user's favorite categories.

At step 825, a profile of the user is created and categorized and stored in a database table. The user profile may be used to define categories of a user's interest, which are pre-defined categories that may be used during subsequent searching. This allows the system of the invention to be updated so that when a new category is created, all matching content (i.e., all relevant content for that category) can be searched. The categories can be further edited by using, for example, the aspect of the invention shown in FIG. 6a.

Once the categories are defined, the user provides a search term and requests, in one example, that the search be conducted within the user's favorite categories, at step 830. For example, the user, via a user workstation, may interact with the server to request a search. At step 835, the search is uploaded to the server to access information content (e.g., by logging onto the server, searching or submitting inquiries). At step 840, the search is processed with the defined categories resulting in the generation of a comprehensive list of currently matching results within the user's favorite categories. The search can be modified at step 845 by, for example, limiting the search to certain categories or, alternatively or in combination, expanding a category.

FIG. 9 is an embodiment of the invention showing steps of content categorization, beginning at step 900. At step 900, a user initiates creation, modification, update, or deletion of categories typically using a content submission toolset, typically via a content categorization form, as discussed above with reference to FIG. 4. At step 905, a check is made whether the user has created a new category. If so, then at step 910, applicable interest categories are identified for each search, typically using the dialog shown in FIG. 4.

FIG. 10 is an embodiment of the invention showing steps of categorization matching, beginning at step 1000. At step 1000, a user takes action to navigate through content by, for example, logging onto a server or selecting a navigation link. At step 1005, the latest list or set of user's categories is queried from a database maintaining the user's profile. At step 1010, a query to obtain the latest list of categories from a content information database that match the user's categories is issued. At step 1015, navigation pages are built from the organized content and user's interest information.

As should now be understood, the invention allows users to designate (or have the system designate based on users' browsing habits, etc.) "preferred" or "favorite" categories from the databases' taxonomies. Once designated, these categories could provide several accelerated ways for users to narrow searches to their usual areas of interest. Using fastpaths based on the preferred categories, for example, in implementation, the user can select the categories of interest from all possible categories, activate a control to save the category set as a preferred category, at which stage, the system records the categories that the user has accessed, and automatically adds them to the list of preferred categories when a certain minimum set of criteria is met (e.g., based on frequency/recency of accessing). The user can then perform fastpath searching which provides an option for the user to search only his/her preferred categories when executing a text search.

At any point after a search has been initiated, the user is informed how many of the matching items fall in each of their favorite categories and how many match all their categories (this includes cross-taxonomy). This is dynamic, and will be updated each time the search criteria change (e.g., user adds another text keyword). At any point after a search has been initiated, the user can narrow the search to show only items that fall in any of their favorite categories, or only show items that fall into all their favorite categories (this includes cross-taxonomy). If the user opts to limit the search to any or all of their favorite categories either initially or after the search has been started, then from the resulting search screen they will be able to expand their search by selecting to no longer limit the search to any one of their individual favorite categories, or selecting to no longer it limiting the search to all their favorite categories.

While the invention has been described in terms of embodiments, those skilled in the art will recognize that the invention can be practiced with modifications and in the spirit and scope of the appended claims.

What is claimed is:
1. A method, comprising:
creating a user profile which includes interests of a user to succinctly provide a basis that defines user preferred categories;
defining the user preferred categories associated with a plurality of taxonomies prior to conducting a search of a database;
storing the defined user preferred categories such that the user preferred categories can be used subsequently in conducting a fast path search, wherein the user preferred categories are recorded and automatically added to a list associated with the user;
selecting a fast path searching operation that allows the search of the database to be conducted as the fast path search in only the defined user preferred categories;
conducting the fast path search of the database located on a server using a displayed control to search the user preferred categories, the search being within a plurality of the user preferred categories based upon search criteria by comparing the search criteria to content information within each of the user preferred categories;
displaying on a workstation search results associated with each of the user preferred categories which have matching criteria based on the conducted fast path search;

displaying the user preferred categories in an expanded manner to show sub categories of the user preferred categories and to show the user preferred categories in a hierarchical relationship;

during the displaying of the user preferred categories, displaying the plurality of taxonomies associated with the results;

using the server to define one or more common categories found within multiple searches as the user preferred categories; and using the server to provide a prompt, which allows one or more previously conducted multiple searches to be added to the user preferred categories.

2. The method of claim 1, further comprising editing one or more of the user preferred categories.

3. The method of claim 2, wherein the editing includes adding or deleting one or more of the user preferred categories.

4. The method of claim 1, further comprising refining the fast path search by conducting an additional search within the user preferred categories which have matching criteria based on the conducted fast path search with an additional search criteria.

5. The method of claim 1, further comprising refining the user preferred categories.

6. The method of claim 5, wherein the refining step includes information defined in a hierarchical manner.

7. The method of claim 1, wherein the conducting step is a faceted search conducted over a distributed network which includes a database and which is accessed by a workstation.

8. The method of claim 1, wherein the defining step is based on past user history, user profiles, survey data or explicit instructions.

9. The method of claim 1, further comprising allowing a user to search the preferred categories in a single step, even when the user preferred categories are from different taxonomies.

10. The method of claim 1, further comprising allowing a user to select one or more categories to be automatically expanded on a search screen, wherein the one or more categories include the user preferred categories.

11. The method of claim 1, further comprising analyzing the user's browsing habits and designating the preferred categories.

12. The method of claim 1, further comprising allowing a user to navigate to a combination of categories within the plurality of different taxonomies.

13. The method of claim 1, further comprising creating a user profile and associating the user preferred categories with the user profile; and during the displaying of the user preferred categories and the taxonomies:

displaying a control for selecting the fast path searching operation;

displaying a control for manually designating the user preferred categories; and displaying a control to directly add a category to user preferred categories.

14. The method of claim 1, further comprising, during the displaying of the user preferred categories and the plurality of taxonomies:

displaying a control for conducting the fast path searching operation;

displaying a control for manually designating the user preferred categories;

displaying a control to directly add a category to user preferred categories;

displaying a control to edit one or more of the user preferred categories; and allowing the user to search the user preferred categories in a single step, even when the user preferred categories are from different taxonomies, wherein the edit allows a user to add or delete one or more of the user preferred categories.

15. The method of claim 1, further comprising refining the search by conducting an additional search within the user preferred categories which have matching criteria.

16. The method of claim 1, further comprising refining the fast path search by selecting one of the displayed user preferred categories and conducting the fast path search again using a more general search category by deleting the selected one of the user preferred categories and any lower level user preferred categories in the hierarchical relationship.

17. A method, comprising:

defining favorite categories associated with a plurality of taxonomies prior to conducting a search of a database;

creating a user profile, which includes interests of a user to succinctly provide a basis that defines the favorite categories and associating the favorite categories with the user profile such that the favorite categories are stored and are used subsequently in conducting a fast path search, wherein the favorite categories are recorded and automatically added to a list associated with the user;

selecting a fast path searching option that allows the search of the database to be conducted as the fast path search in only the defined favorite categories;

conducting the fast path search of the database located on a server using a displayed control to search the favorite categories, the fast path search being within a plurality of the favorite categories based upon search criteria by comparing the search criteria to content information within each favorite category of the favorite categories;

retrieving and displaying search results associated with said each favorite category of the favorite categories which have matching criteria based on the conducted fast path search during the displaying of the favorite categories;

allowing the user to conduct the fast path search of the database on the server for the plurality of the favorite categories in a single step for the content information obtained by the comparing, even when the favorite categories are from different taxonomies;

using the server to define one or more common categories found within multiple searches as the favorite categories;

prompting to the user to add one or more common categories found within one or more previous searches to the favorite categories;

and displaying the favorite categories in an expanded manner to show sub categories of the favorite categories and to show the favorite categories in a hierarchical relationship;

presenting an interface to the user allowing the user to specify selected ones of the taxonomies to expand by default.

18. The method of claim 17, wherein the favorite categories represent a categorization scheme.

19. The method of claim 18, wherein the categorization scheme includes a hierarchical structure of one or more of the favorite categories.

20. The method of claim 17, wherein the favorite categories include at least one predefined category.

21. The method of claim 17, wherein the user profile contains information of at least one of the user's interests.

22. The method of claim 17, wherein the favorite categories include an edit function.

23. The method of claim 22, wherein the edit function is at least one of an expand function, a delete function and an add function.

24. The method of claim 17, wherein the favorite categories are pre-defined categories, categorized in a hierarchical format to provide specific search focus.

25. The method of claim 17, further comprising providing a content submission tool used to acquire, create, update or delete content information associated with the favorite categories.

26. The method of claim 17, further comprising editing the favorite categories by providing a hierarchical categorization scheme.

27. The method of claim 17, further comprising refining the search by selecting a favorite category to delete and any of its lower level relations.

28. The method of claim 17, further comprising refining the fast path search by selecting one of the displayed favorite categories and conducting the fast path search again using a more general search category by deleting the selected one of the favorite categories and any lower level user preferred categories in the hierarchical relationship.

29. A system comprising:
a server having a hardware and a database containing data associated with user predefined categories associated with a plurality of taxonomies that are defined and stored such that a user can conduct a fast path search using the user predefined categories;
at least one of a hardware and software component for creating a user profile, which includes interests of the user to succinctly provide a basis that defines the user predefined categories, and associating the user predefined categories with the user profile;
at least one of hardware and software component for storing the associated user redefined categories such that the user predefined categories are used subsequently in conducting a fast path searching operation, wherein the user predefined categories are recorded and automatically added to a list associated with the user;
at least one of hardware and software component for selecting the fast path searching operation that allows a search of the database to be conducted as fast path search using only the defined and stored user preferred categories;
at least one of a hardware and software component for performing the fast path searching of the database for content information associated with the user predefined categories based upon search criteria, the system compares the search criteria to the content information within each user predefined category of the user predefined categories and provides fast path search results to the user by presenting a list of the user predefined categories, which have matching categories with the fast path search results while providing and displaying the user predefined categories in a list of taxonomies; and
a behavior analyzer, structured to remember one or more previous searches and prompt the user to add one or more common categories found within the one or more previous searches to the user predefined categories,
wherein:
the user predefined categories are associated with a plurality of different taxonomies in the list of taxonomies,
the user predefined categories are displayed in an expanded manner to show sub categories and to show the user predefined categories in a hierarchical relationship;
a numerical representation of a number of search results associated with each user predefined category of the user predefined categories is displayed; and
during the displaying of the user predefined categories, the plurality of taxonomies associated with the user predefined categories are displayed along with another numerical representation of another number of search results associated with the plurality of taxonomies.

30. The system of claim 29, further comprising at least one of a hardware and software component for defining the user predefined categories.

31. The system of claim 29, wherein the at least one of a hardware and software component resides on a server provided by a service provider.

32. The system of claim 29, further comprising at least one of a hardware and software component for listing the user predefined categories outside of its provided taxonomies.

33. The system of claim 29, further comprising at least one of a hardware and software component which creates the user profile containing information of at least one of the user's interests to create the user predefined categories.

34. The system of claim 29, further comprising an editing tool capable of at least one of expanding, deleting and adding the user predefined categories.

35. The system of claim 29, further comprising a content submission tool used to acquire, create, update or delete content information associated with the user predefined categories.

36. The system of claim 29, further comprising refining the fast path search by selecting one of the displayed user preferred categories and conducting the fast path search again using a more general search category by deleting the selected one of the user preferred categories and any lower level user preferred categories in the hierarchical relationship.

37. A computer program product comprising a computer usable storage medium having readable program code embodied in the medium, the computer program product includes at least one component to:
define user preferred categories associated with a plurality of taxonomies prior to conducting a search of a database;
create a user profile, which includes interests of a user to succinctly provide a basis that defines the user preferred categories, and associate the user preferred categories with the user profile such that the user preferred categories are stored and used subsequently in conducting a fast path search, wherein the user preferred categories are recorded and automatically added to a list associated with the user;
select a fast path search option that allows the search of the database to be conducted as the fast path search in only the user preferred categories;
conduct the fast path search within a plurality of the user preferred categories based upon search criteria by comparing the search criteria to content information within each user preferred category of the user preferred categories;
display search results associated with each of the user preferred categories which have matching criteria based on the conducted fast path search;
displaying the user preferred categories in an expanded manner to show sub categories of the user preferred categories and to show the user preferred categories in a hierarchical relationship;

display a numerical representation of a number of search results associated with each displayed user preferred category of the displayed user preferred categories;

during the displaying of the user preferred categories, displaying the plurality of taxonomies associated with fast path search results along with another numerical representation of another number of search results associated with the plurality of taxonomies, wherein the plurality of taxonomies and the user preferred categories are displayed in different areas;

define one or more common categories found within multiple searches as the user preferred categories; and prompt the user to add one or more categories to the user preferred categories based on user's previous search activity.

38. The computer program product of claim 37, further comprising refining the fast path search by selecting one of the displayed user preferred categories and conducting the fast path search again using a more general search category by deleting the selected one of the user preferred categories and any lower level user preferred categories in the hierarchical relationship.

39. A method for deploying an application for web searching, comprising:

providing a computer infrastructure being operable to:

creating a user profile which includes interests of a user to succinctly provide a basis that defines user preferred categories;

defining the user preferred categories associated with a plurality of taxonomies prior to conducting a search of a database;

storing the defined user preferred categories such that the user preferred categories are used subsequently in conducting a fast path search, wherein the user preferred categories are recorded and automatically added to a list associated with a user;

selecting a fast path searching option that allows the search of the database to be conducted as the fast path search in only selected user preferred categories;

conducting the fast path search within a plurality of the user preferred categories based upon search criteria by comparing the search criteria to content information within each of the user preferred categories;

displaying search results associated with each user preferred category of the user preferred categories which have matching criteria based on the conducted fast path search;

displaying the user preferred categories in an expanded manner to show sub categories of the user preferred categories and to show the user preferred categories in a hierarchical relationship;

displaying a numerical representation of a number of search results associated with each of the displayed user preferred categories;

during the displaying of the user preferred categories, displaying the plurality of taxonomies associated with the results along with another numerical representation of another number of search results associated with the plurality of taxonomies, wherein the plurality of taxonomies and the user preferred categories are displayed in different areas;

defining one or more common categories found within multiple searches as the user preferred categories; and prompting a user to add one or more new preferred categories to the user preferred categories based on one or more previously conducted searches.

40. The method of claim 39, further comprising refining the fast path search by selecting one of the displayed user preferred categories and conducting the fast path search again using a more general search category by deleting the selected one of the user preferred categories and any lower level user preferred categories in the hierarchical relationship.

\* \* \* \* \*